United States Patent
Zeng et al.

(10) Patent No.: US 10,364,803 B2
(45) Date of Patent: Jul. 30, 2019

(54) MODULAR TOWER-TYPE SOLAR THERMAL POWER GENERATION SYSTEM

(71) Applicant: SHENZHEN ENESOON SCIENCE & TECHNOLOGY CO., LTD, Guangdong (CN)

(72) Inventors: Zhiyong Zeng, Guangdong (CN); Xiaomin Cui, Guangdong (CN); Bei Huang, Guangdong (CN)

(73) Assignee: SHENZHEN ENESOON SCIENCE & TECHNOLOGY CO., LTD, Guangdong (CN)

( * ) Notice: Subject to any disclaimer, the term of this patent is extended or adjusted under 35 U.S.C. 154(b) by 50 days.

(21) Appl. No.: 15/540,357

(22) PCT Filed: Dec. 31, 2014

(86) PCT No.: PCT/CN2014/096055
§ 371 (c)(1),
(2) Date: Jun. 28, 2017

(87) PCT Pub. No.: WO2016/106745
PCT Pub. Date: Jul. 7, 2016

(65) Prior Publication Data
US 2017/0350375 A1    Dec. 7, 2017

(51) Int. Cl.
*F03G 6/06* (2006.01)
*F24S 20/00* (2018.01)
(Continued)

(52) U.S. Cl.
CPC ............... *F03G 6/065* (2013.01); *F03G 6/06* (2013.01); *F24S 20/20* (2018.05); *F24S 23/70* (2018.05);
(Continued)

(58) Field of Classification Search
CPC ....... Y02E 10/40–10/46; F24S 2020/10; F24S 20/20; F24J 2002/0038; F24J 2/07; F03G 6/06; F03G 6/065
See application file for complete search history.

(56) References Cited

U.S. PATENT DOCUMENTS 4,117,682 A * 10/1978 Smith ................... F03G 6/065
                                                                 60/641.8
2010/0319684 A1* 12/2010 Almogy ................ F24D 11/003
                                                                 126/714
(Continued)

FOREIGN PATENT DOCUMENTS

CN    200946553 Y    9/2007
CN    101825072 A    9/2010
(Continued)

OTHER PUBLICATIONS

International Search Report and Written Opinion for Application No. PCT/CN2014/096055, dated Aug. 26, 2015.

*Primary Examiner* — Mark A Laurenzi
*Assistant Examiner* — Xiaoting Hu
(74) *Attorney, Agent, or Firm* — Marshall, Gerstein & Borun LLP

(57) ABSTRACT

The present application relates to a modular tower-type solar thermal power generation system, which comprises: a solar thermal collector device configured for collecting solar thermal energy, a heat exchanger connected to the solar thermal collector device and configured for producing superheated saturated steam, and a thermal power conversion device connected to the heat exchanger and configured for converting the superheated saturated steam into electrical energy; the solar thermal collector device comprises a plurality of tower-type solar thermal modules. By adopting a solar power generation system with a modular solar energy collector device, the present application can simplify the
(Continued)

construction process, reduce the construction period, and can further reduce design cost and investment cost of a power station, as well as improve the efficiency of the heliostat field; moreover, when one of the single towers malfunctions, the working situations of other tower-type solar thermal modules won't be affected, and thus the continuity and stability of power supply using the whole power generation system are ensure.

12 Claims, 5 Drawing Sheets

(51) Int. Cl.
*F24S 20/20* (2018.01)
*F24S 80/20* (2018.01)
*F24S 50/20* (2018.01)
*F24S 23/70* (2018.01)

(52) U.S. Cl.
CPC ............... *F24S 50/20* (2018.05); *F24S 80/20* (2018.05); *F24S 2020/10* (2018.05); *Y02E 10/46* (2013.01)

(56) References Cited

U.S. PATENT DOCUMENTS

2012/0125001 A1  5/2012  Ittner
2015/0020793 A1* 1/2015  Llorente Folch ....... F24S 80/30
                                                126/651

FOREIGN PATENT DOCUMENTS

| CN | 203296823 U | 11/2013 |
| CN | 103726998 A | 4/2014 |
| EP | 2258947 A1 | 12/2010 |
| WO | WO-2014/052902 A1 | 4/2014 |

* cited by examiner

MODULAR TOWER-TYPE SOLAR THERMAL POWER GENERATION SYSTEM

TECHNICAL FIELD

The present invention relates to the field of electric power technology, and more particularly, to a modular tower solar thermal power generation system.

BACKGROUND

A tower solar thermal power generation system has many advantageous characteristics, such as a wide matching setting range for a temperature field and an energy field, a large condenser ratio, a high focusing temperature, a large energy flow density, a high thermal conversion efficiency, a wide application range, and so on, and thus the system can perform many developments of applications of solar energy, such as solar thermal power generation, hydrogen production from water, sea water desalination, metal smelting, and so on, on a large scale. Therefore, the tower solar thermal power generation system is a platform for diversified utilization of solar energy, which has much value potential.

There have been many developed countries which have carried out the research of tower solar power technology. However, up to now the development of the technology is still subjected to many obstacles because of two main reasons: first, the cost of heliostat tracking is too high, because the accuracy requirement of long-distance tracking is very high, also gear wheels must achieve seamless transmissions, and thus the difficult production caused by this requirement is one of the reason leading to high tracking cost; secondly, the scale of this power generation may be too small, so that the power generation capacity expansion is greatly limited; since the scale of tower power generation depends on the scale of the heliostat field, the larger the scale of thermal power generation, the greater the cost reduction space; however, when the scale of the heliostat field is expanded to a certain extent, its overall efficiency will appear a sharply decreased downtrend. Therefore, the power generation cost of current tower solar power generation systems remains at a high level, which is still far from the market requirements.

SUMMARY

A technical problem to be solved by the present application is to provide a sustainable, stable and efficient modular tower solar thermal power generation system, aiming at overcoming the above-mentioned shortages of the prior art.

A technical solution adopted by the present application to solve the technical problem is as follows:

A modular tower solar thermal power generation system, which comprises: a solar thermal collector device configured for collecting solar thermal energy, a heat exchanger connected to the solar thermal collector device and configured for producing steam, and a thermal power conversion device connected to the heat exchanger and configured for converting steam into electrical energy; wherein, the solar thermal collector device comprises a plurality of tower solar thermal modules.

In the solar thermal power generation system of the present application, the plurality of tower solar thermal modules include a plurality of A-type tower solar thermal module; wherein, each of the A-type tower solar thermal modules comprises a first heliostat configured for focusing sunlight and a first solar thermal tower provided with a first thermal collector;

the plurality of A-type tower solar thermal modules are all connected with the heat exchanger through a same centralized thermal storage unit configured to store thermal energy of heated thermal working medium in the first thermal collector.

In the solar thermal power generation system in present application, the plurality of tower solar thermal modules include a plurality of B-type tower solar thermal modules; wherein, each of the B-type tower solar thermal modules comprises a second heliostat configured for focusing sunlight and a second solar thermal tower provided with a second thermal collector, and further comprises a distributed thermal storage unit connected to the second solar thermal tower and configured for storing the thermal energy of heated thermal working medium in the second thermal collector.

In the solar thermal power generation system in present application, the heat exchanger includes a plurality of sub-thermal exchangers, and each B-type tower solar thermal module includes one of the sub-thermal exchangers.

In the solar thermal power generation system in present application, the sub-thermal exchangers of each B-type tower solar thermal module is connected to the thermal power conversion device by a high temperature steam thermal storage device configured for storing steam.

In the solar thermal power generation system in present application, all the plurality of tower solar thermal modules can be A-type tower solar thermal modules, wherein some of the A-type tower solar thermal modules use molten salt as thermal working medium, and the other A-type tower solar thermal modules use steam as thermal working medium;

the A-type tower solar thermal modules using molten salt as thermal working medium are connected in series; the A-type tower solar thermal modules using molten salt as thermal working medium are connected in parallel with the A-type tower solar thermal modules using steam as thermal working medium.

In the solar thermal power generation system in present application, all the plurality of tower solar thermal modules can be B-type tower solar thermal modules.

In solar thermal power generation system in present application, the plurality of tower solar thermal modules includes A-type tower solar thermal modules and B-type tower solar thermal modules, wherein, all the A-type tower solar thermal modules using molten salt as thermal working medium, and all the B-type tower solar thermal modules using steam as thermal working medium; the A-type tower solar thermal modules are connected in series or in parallel with the B-type tower solar thermal modules.

In solar thermal power generation system in present application, the plurality of tower solar thermal modules include A-type tower solar thermal modules and B-type tower solar thermal modules, wherein, some of the A-type tower solar thermal modules use molten salt as thermal working medium, the others of the A-type tower solar thermal modules use steam as thermal working medium, and all the B-type tower solar thermal modules use molten salt as thermal working medium;

all the A-type tower solar thermal modules using molten salt as thermal working medium are connected in parallel with all the A-type tower solar thermal modules using steam as thermal working medium, the B-type tower solar thermal modules are connected in series, and the A-type tower solar thermal modules are connected in parallel with the B-type tower solar thermal modules.

In the solar thermal power generation system in present application, the generated power of each of the tower solar thermal modules is 10-25 MW.

The beneficial effects of the present application include: by adopting a solar power generation system with a modular solar energy collector device, the present application can simplify the construction process, reduce the construction period, and can further reduce design cost and investment cost, as well as improve the efficiency of the heliostat field; moreover, when one of the single towers malfunctions, the working situations of other tower solar thermal modules won't be affected, and thus the continuity and stability of power supply using the whole power generation system are ensured.

BRIEF DESCRIPTION OF THE DRAWINGS

The present application will be further described below regarding the accompanying drawings and embodiments, wherein.

DETAILED EMBODIMENTS

Figure 1:
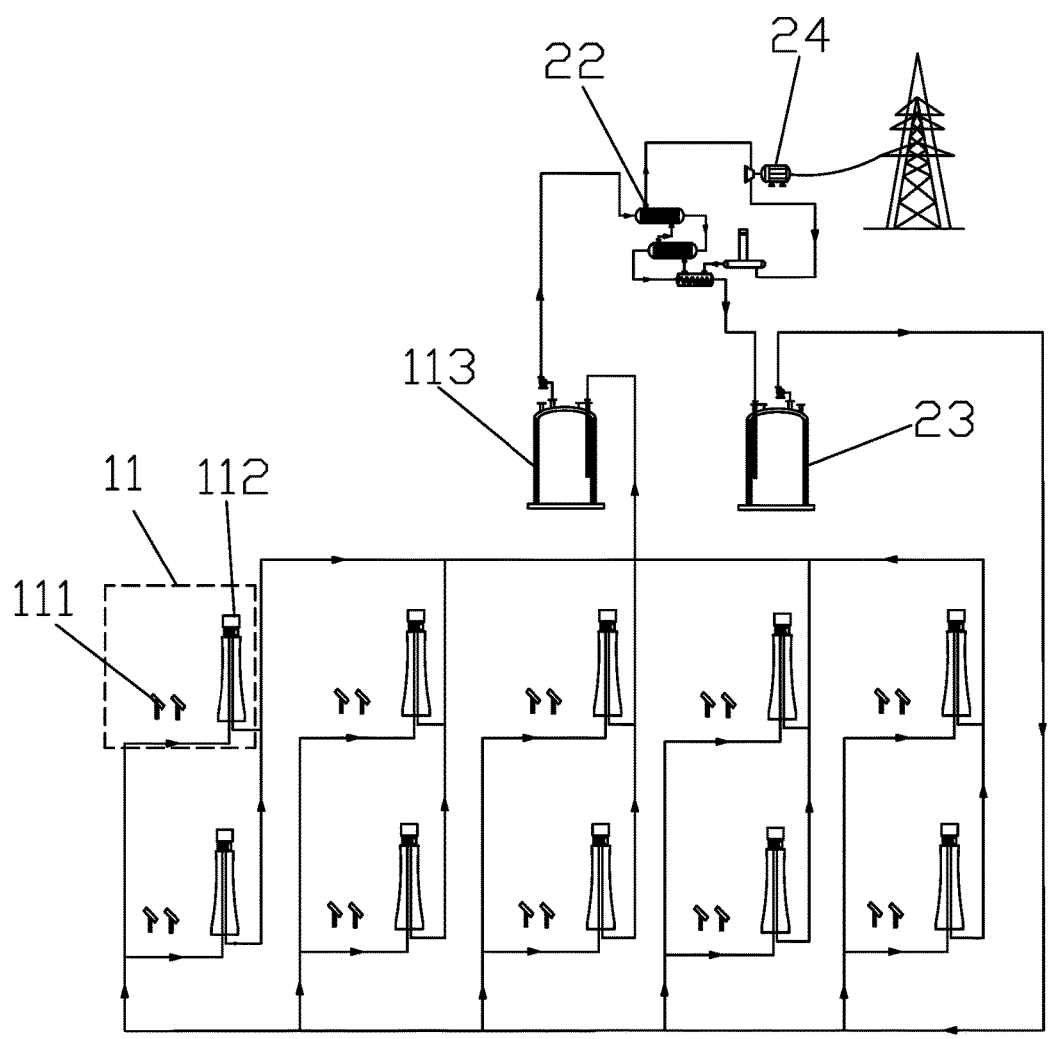
FIG. 1 is a schematic diagram of a modular tower solar thermal power generation system comprising an A-type tower solar thermal module according to a preferred embodiment of the present application.
Figure 2:
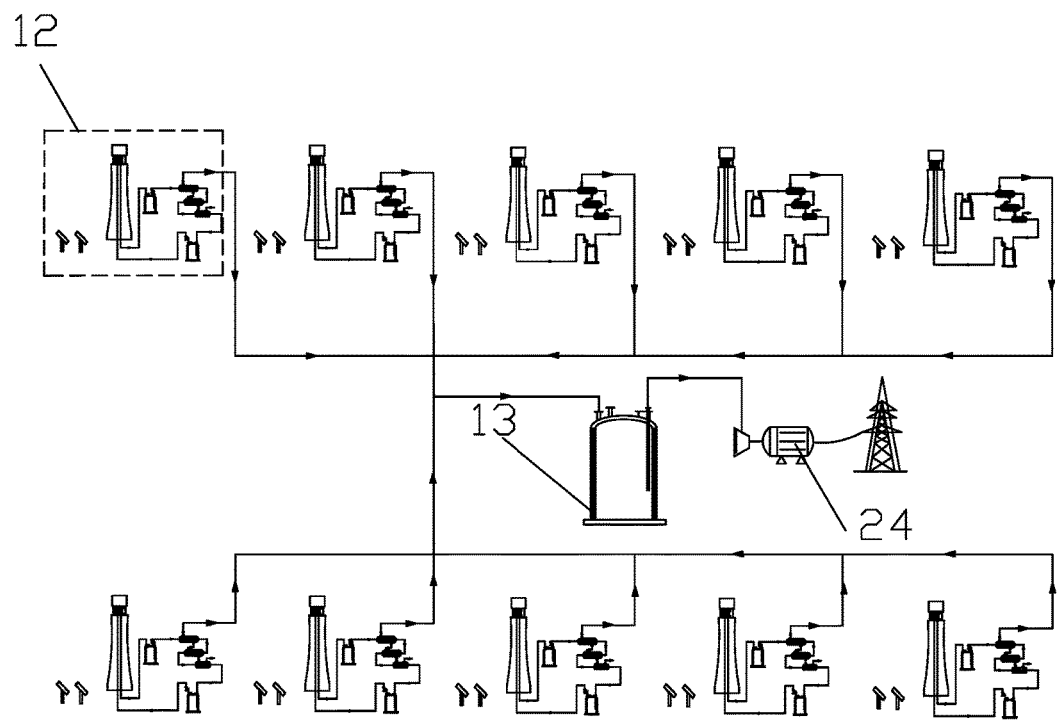
FIG. 2 is a schematic diagram of a modular tower solar thermal power generation system comprising a B-type tower solar thermal module according to a preferred embodiment of the present application.

The principle of a modular tower solar thermal power generation system of a preferred embodiment of the present application is shown in FIGS. 1 and 2. The system comprises: a solar thermal collector device configured for collecting solar thermal energy, a heat exchanger connected to the solar thermal collector device and configured for producing superheated or saturated steam, and a thermal power conversion device 24 connected to the heat exchanger and configured for converting superheated or saturated steam into electrical energy; the solar thermal collector device comprises a plurality of tower solar thermal modules 11 and 12 configured for collecting solar thermal. By adopting a solar thermal power generation system with modular solar thermal collectors (hereinafter referred to as a modular solar thermal power generation system), when constructing a large-scale solar thermal power station, it only needs to reproduce the tower solar thermal modules, so that the construction process can be simplified, the construction period can be reduced, and the design cost and the design investment of a power generation system can also be reduced.

Meanwhile, adopting the modular solar thermal power system can also increase the power supply stability of the entire power generation system. For a single tower solar thermal power generation, no matter which part malfunctions, the stability of the entire power generation system will be affected; after adopting the modular solar thermal power generation system, problems of a single tower will not affect the working statuses of other modules, so that the continuity and stability of power supply using the power generation system are ensured. Further, adopting the modular solar thermal power system can also improve the efficiency of a heliostat mirror field. With respect to a large single tower solar thermal power generation system, the far-end of a heliostat mirror field is very distant from the tower top and which causes low efficiency issue; after adopting the modular solar thermal power system, the distance between the mirror and the tower top can be greatly reduced, which will improve the efficiency of the heliostat mirror field, also the scale and the cost of the heliostat mirror field will be reduced.

In the above embodiments, the thermal power conversion device 24 of the modular solar thermal power generation system is preferably a steam turbine generator set, and the specific type is not limited.

In a further embodiment, as shown in FIG. 1, the plurality of tower solar thermal modules 11 and 12 for constituting a solar thermal collector device of the above modular solar thermal power generation system include a plurality of A-type tower solar thermal modules 11. Wherein, each A-type tower solar thermal module 11 comprises a first heliostat 111 configured for focusing sunlight and a first solar thermal tower 112 provided with a first thermal collector; the plurality of A-type tower solar thermal modules 11 are all connected with the heat exchanger 22 through a centralized thermal storage unit 113 configured to store thermal energy of heated thermal working medium in the first thermal collector.

As shown in FIG. 1, the work procedures of the A-type tower solar thermal modules 11 are that: the first heliostat 111 reflects and focuses sunlight and thereby heats the thermal working medium in the first thermal collector on the top of the first solar thermal column 112, the thermal energy of the heated thermal working medium in the first thermal collectors of all the A-type tower solar thermal modules 11 is stored in the centralized thermal storage unit 113, and the stored thermal energy generates superheated or saturated steam through the heat exchanger 22, and drives the thermal power conversion device 24 to generate electricity.

Preferably, as shown in FIG. 1, a low-temperature steam storage device 23 is connected between the heat exchanger and the first solar thermal tower 111 of the A-type solar thermal module 11, the thermal working medium after heat exchange by the heat exchanger 22 is pumped to the top of the solar thermal tower 112 to be heated for recycling.

Figure 3:
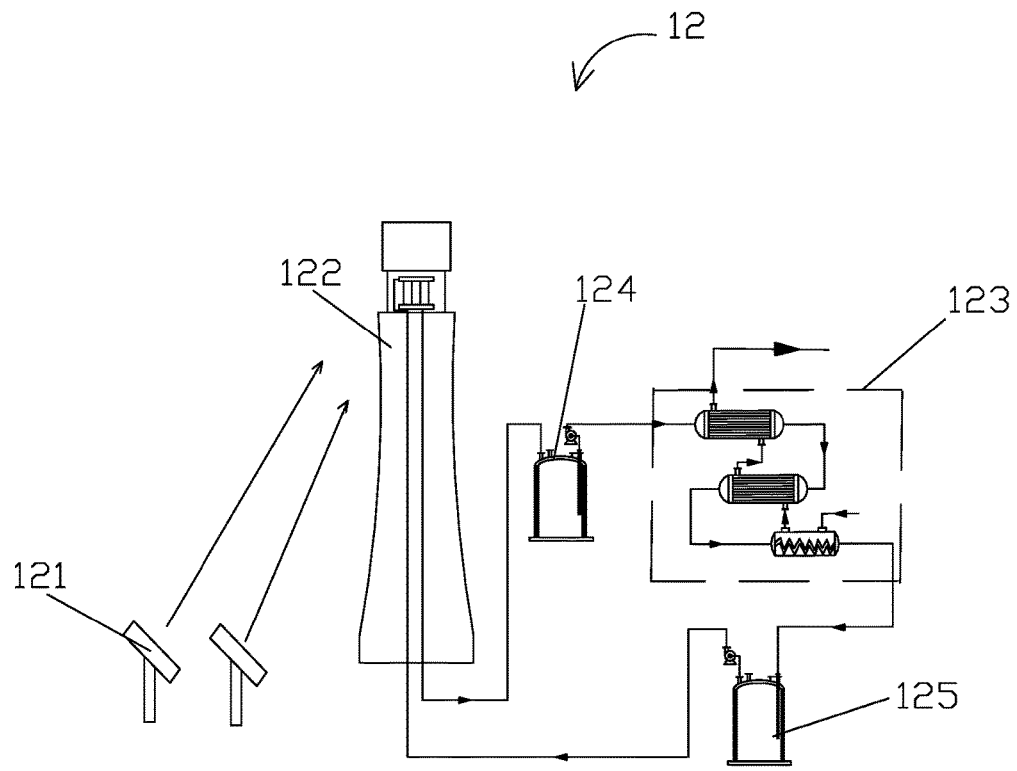
FIG. 3 is a schematic diagram of a single B-type tower solar thermal module according to a preferred embodiment of the present application.

In a further embodiment, as shown in FIGS. 2 and 3, the plurality of tower solar thermal modules 11 and 12 for constituting a solar thermal collector of the above modular solar thermal power generation system also includes or at least one of them includes B-type tower solar thermal modules 12. Wherein, each B-type tower solar thermal modules 12 comprises a second heliostat 121 configured for focusing sunlight, a second solar thermal tower 122 provided with a second thermal collector, and a distributed thermal storage unit 124 connected to the second solar thermal tower 122 and configured for storing the thermal energy of heated thermal working medium in the second thermal collector.

In other words, the above-mentioned A-type tower solar thermal module 11 is a solar thermal module without any thermal storage unit, and realizes centralized thermal storage by adopting a centralized thermal storage unit 113. The B-type tower solar thermal module 12 is a solar thermal module with a distributed thermal storage unit 124.

Preferably, in the above-described embodiment, each of the B-type tower solar thermal module 12 is connected to a sub-thermal exchanger 123, the sub-thermal exchangers 123 of all the B-type tower solar thermal module 12 connected to the thermal power conversion device 24 by a common temperature steam energy storage 13, so that the superheated or saturated steam generated by the sub-thermal exchangers 123 is stored and then transmitted to the thermal power conversion device 24 for power generating.

As shown in FIGS. 2 and 3, the work procedures of the B-type tower solar thermal modules 12 are that: the second heliostat 121 reflects and focuses the sunlight and thereby heats the thermal working medium in the second thermal collector at the top of the second solar thermal tower 122, a part of the heated thermal working medium stores heat through the distributed thermal storage unit 124, and another part of the heated thermal working medium generates superheated or saturated steam through the heat exchanger 123 to drive the thermal power conversion 24 to generate electricity.

Preferably, as shown in FIG. 3, in the above embodiment, a low temperature steam thermal storage 125 is connected between the sub-thermal exchanger 123 of each B-type tower solar thermal module 12 and the solar thermal tower 122, the thermal working medium after heat exchange by the heat exchanger 123 is pumped to the top of the solar thermal tower 122 to be heated for recycle.

In the above embodiment, the high temperature steam thermal storage device 13 of the modular solar power generation system comprises a thermal storage tank or consists of a plurality of thermal storage tanks.

In a specific embodiment 1, as shown in FIG. 1, the solar thermal collector device of the modular solar power generation system is entirely constituted by the A-type tower solar thermal modules 11. Wherein, the superheated or saturated steam generated by all the A-type tower solar thermal module 11 is stored in the high temperature steam thermal storage device of the modular solar power generation system to drive the thermal power conversion device 24 (a steam turbine generator) to generate electricity. Although compared with the B-type tower solar thermal module 12, entirely adopting the A-type tower solar thermal modules 11 may relatively reduce the utilization efficiency of the superheat saturated steam generated by each solar thermal module, the construction cost of the entire modular solar power generation system can be reduced.

Further, in the above-described embodiment 1, the A-type tower solar thermal module 11 preferably uses steam or molten salt as thermal working medium of the thermal collector and the centralized thermal storage unit. When all the A-type tower solar thermal modules 11 of the modular solar power generation system use steam as thermal working medium, the A-type tower solar thermal modules 11 are all connected in series; when all the A-type tower solar thermal modules 11 of the modular solar power generation system use molten salt as thermal working medium, at least two of the A-type tower solar thermal modules 11 are connected in series; when some of the A-type tower solar thermal modules 11 of the modular solar power generation system use molten salt as thermal working medium, and the other A-type tower solar thermal modules 11 of the modular solar power generation system use steam as thermal working medium, the A-type tower solar thermal modules 11 using molten salt as thermal working medium are connected in series, at least two of the A-type tower solar thermal modules 11 using steam as thermal working medium are connected in series, and the A-type tower solar thermal modules 11 using molten salt as thermal working medium are connected in parallel with the A-type tower solar thermal modules 11 using steam as thermal working medium.

Alternatively, when all the A-type tower solar thermal modules 11 of the modular solar power generation system use steam as thermal working medium, the A-type tower solar thermal modules 11 are all connected in parallel. When all the A-type tower solar thermal modules 11 of the modular solar power generation system use molten salt as thermal working medium, at least two of the A-type tower solar thermal modules 11 are connected in parallel. When some of the A-type tower solar thermal modules 11 of the modular solar power generation system use molten salt as thermal working medium, and the other A-type tower solar thermal modules 11 of the modular solar power generation system use steam as thermal working medium, the A-type tower solar thermal modules 11 using molten salt as thermal working medium are connected in series, at least two of the A-type tower solar thermal modules 11 using steam as thermal working medium are connected in parallel, and the A-type tower solar thermal modules 11 using molten salt as thermal working medium are connected in parallel with the A-type tower solar thermal modules 11 using steam as thermal working medium.

In another specific embodiment 2, as shown in FIG. 2, the solar thermal collector device of the modular solar power generation system is entirely constituted by the B-type tower solar thermal modules 12. Wherein, a part of the superheated or saturated steam generated by all the B-type tower solar thermal module 12 is stored in the distributed thermal storage unit, and the other part of the superheated or saturated steam is stored in the high temperature steam thermal storage device to drive the thermal power conversion 24 (the steam turbine generator) to generate electricity. Although compared with the A-type tower solar thermal modules 11, entirely adopting the B-type tower solar thermal modules 11 may increase the construction cost of the entire modular solar power generation system, the utilization efficiency of the superheated or saturated steam generated by each solar thermal module can be improved, and thus the power generation efficiency of the whole modular solar power generation system can be improved.

Further, in the above-described embodiment 2, the B-type tower solar thermal module 12 preferably uses molten salt as thermal working medium for the thermal collector and the distributed thermal storage unit. When all the B-type tower solar thermal modules 12 of the modular solar power generation system use molten salt as thermal working medium, at least two of the B-type tower solar thermal modules 12 are connected in series or in parallel.

Figure 4:
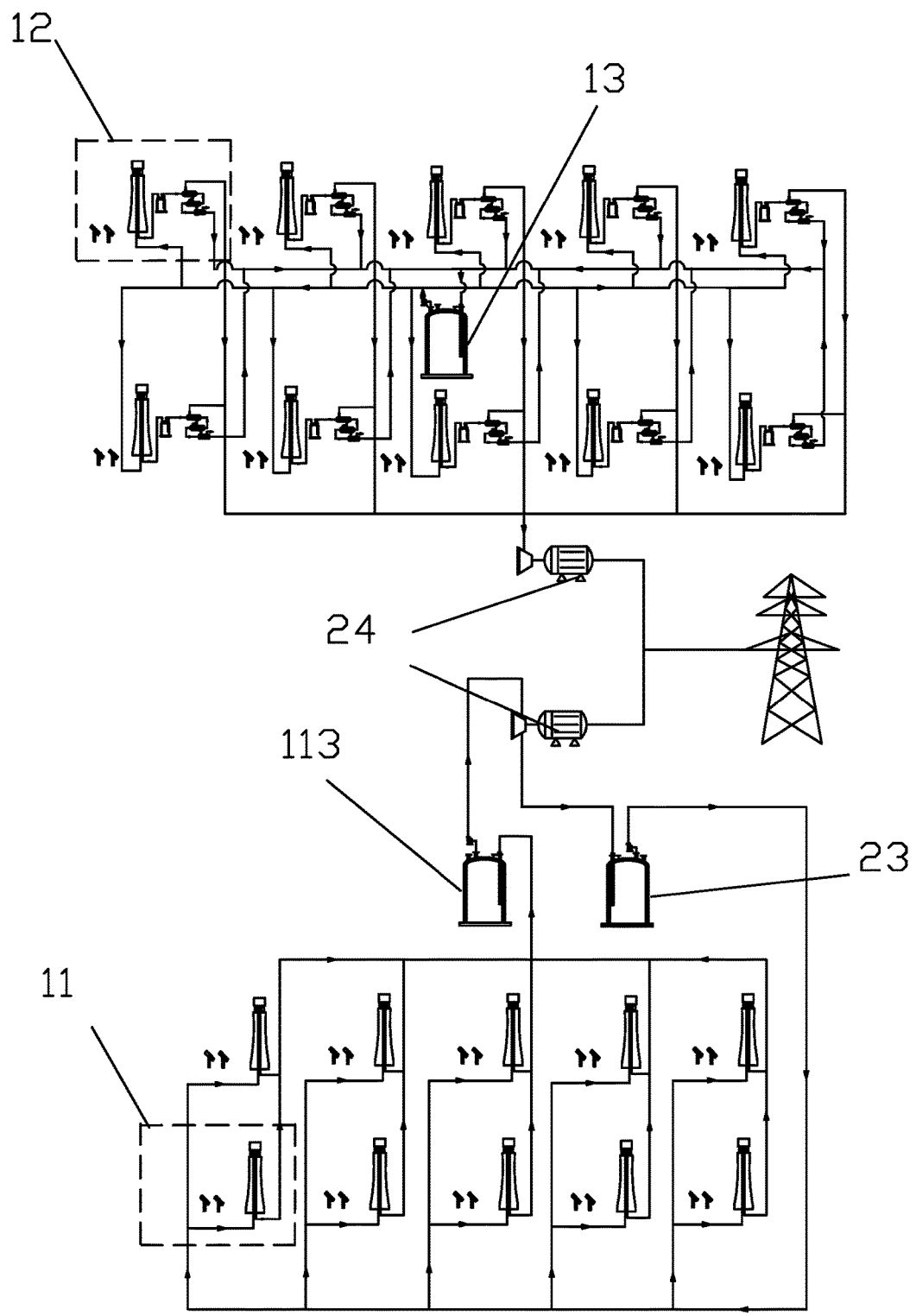
FIG. 4 is a first schematic diagram of a modular tower solar thermal power generation system comprising both an A-type tower solar thermal module and a B-type tower solar thermal module according to a preferred embodiment of the present application.
Figure 5:
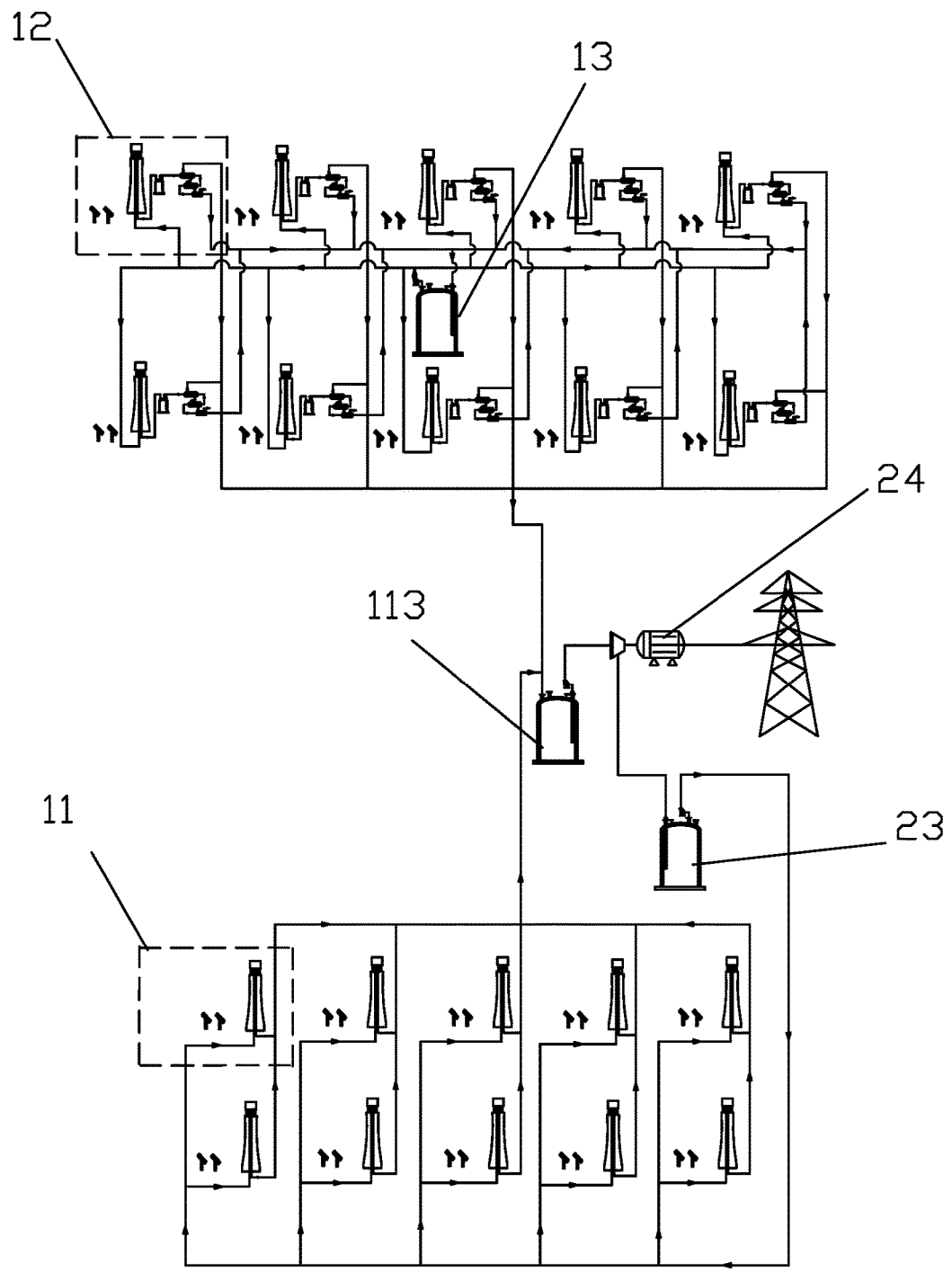
FIG. 5 is a second schematic diagram of a modular tower solar thermal power generation system comprising both an A-type tower solar thermal module and a B-type tower solar thermal module according to a preferred embodiment of the present application.
Figure 6:
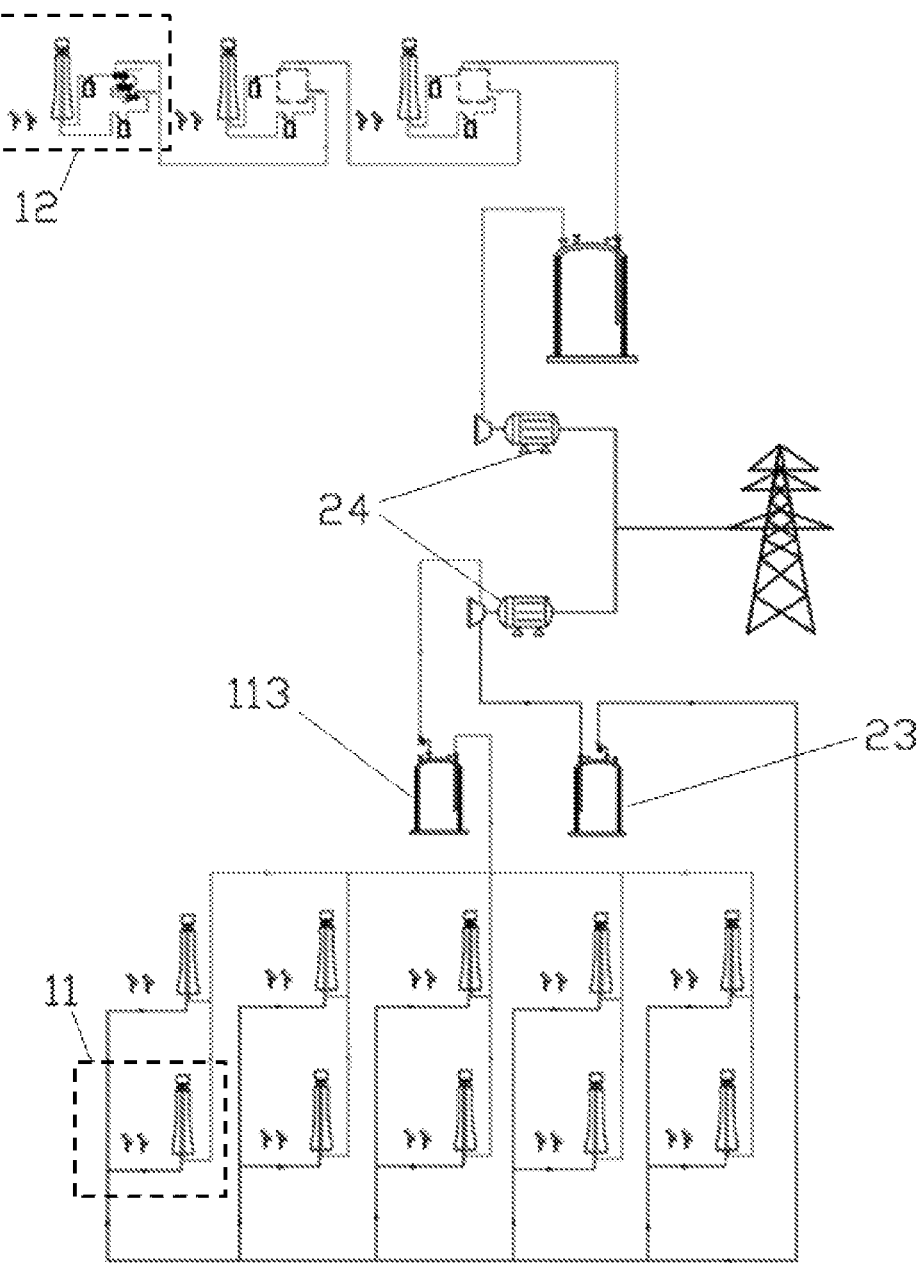
FIG. 6 is a third schematic diagram of a modular tower solar thermal power generation system comprising both A-type tower solar thermals module and B-type tower solar thermal modules according to a preferred embodiment of the present application.

In another specific embodiment 3, as shown in FIGS. 4 to 6, also referring FIG. 1, FIG. 2 and FIG. 3, the solar thermal collector device of the aforesaid modular solar power generation system comprises both the A-type tower solar thermal modules 11 and the B-type tower solar thermal modules 12. Wherein, the work procedures of a single A-type tower solar thermal module 11 and a single B-type tower solar thermal module 12 can refer to the description of the previous embodiments, and will not be repeated here.

Further, in the above-mentioned embodiment 3, all the A-type tower solar thermal modules 11 use steam as thermal working medium, all the B-type tower solar thermal modules 12 use molten salt as thermal working medium, and at least two of the A-type tower solar thermal modules 11 are connected in series; alternatively, at least two of the B-type tower solar thermal modules 12 are connected in series, and the A-type tower solar thermal modules 11 are connected in parallel with the B-type tower solar thermal modules 12. Alternatively, all the A-type tower solar thermal modules 11 use steam as thermal working medium, and all the B-type tower solar thermal modules 12 use molten salt as thermal working medium; at least two of the A-type tower solar thermal modules 11 are connected in parallel, or at least two of the B-type tower solar thermal modules 12 are connected in parallel, and the A-type tower solar thermal modules 11 are connected in parallel with the B-type tower solar thermal modules 12.

Further, in the above-mentioned embodiment 3, all the A-type tower solar thermal modules 11 use molten salt as thermal working medium, all the B-type tower solar thermal modules 12 use molten salt as thermal working medium, and at least two of the A-type tower solar thermal modules 11 are connected in series; alternatively, at least two of the B-type tower solar thermal modules 12 are connected in series, and the A-type tower solar thermal modules 11 are connected in series or in parallel with the B-type tower solar thermal modules 12. Alternatively, all the A-type tower solar thermal modules 11 use molten salt as thermal working medium, all the B-type tower solar thermal modules 12 use molten salt as thermal working medium, and at least two of the A-type tower solar thermal modules 11 are connected in parallel; alternatively, at least two of the B-type tower solar thermal modules 12 are connected in parallel, and the A-type tower solar thermal modules 11 are connected in series or in parallel with the B-type tower solar thermal modules 12.

Further, in the above-mentioned embodiment 3, some of the A-type tower solar thermal modules 11 use molten salt as thermal working medium, the other A-type tower solar thermal modules 11 use steam as thermal working medium, and all the B-type tower solar thermal modules 12 use molten salt as thermal working medium. The A-type tower solar thermal modules 11 using molten salt as thermal working medium are all connected in parallel with the A-type tower solar thermal modules 11 using steam as thermal working medium, the B-type tower solar thermal modules 12 are connected in series or in parallel with each other, and the A-type tower solar thermal modules 11 are connected in parallel with the B-type tower solar thermal modules 12. Alternatively, some of the A-type tower solar thermal modules 11 use molten salt as thermal working medium, the other A-type tower solar thermal modules 11 use steam as thermal working medium, and all the B-type tower solar thermal modules 12 use molten salt as thermal working medium; the A-type tower solar thermal modules 11 using molten salt as thermal working medium are all connected in parallel with the A-type tower solar thermal modules 11 using steam as thermal working medium, the B-type tower solar thermal modules 12 are connected in series or in parallel with each other, and the A-type tower solar thermal modules 11 are connected in parallel with the B-type tower solar thermal modules 12.

In another preferred embodiment, the modular solar power generation system comprises twenty tower solar thermal modules, and the power of each module is 10 MW; wherein ten A-type tower solar thermal modules 11 and ten B-type tower solar thermal modules 12 are included, the thermal storage time of the ten B-type tower solar thermal modules 12 with thermal storage is 8 hours, and the ten A-type tower solar thermal modules 11 without thermal storage generate power through heated steam, with a centralized thermal storage time of 2 hours.

In the above embodiments, the power of a single tower solar thermal module could be 5-100 MW, preferably 10-25 MW, to achieve an optimum power generation effect, but also the use of tower solar thermal modules with other power is not limited.

In conclusion, by adopting a solar power generation system with modular solar energy collector device, the present application can simplify the construction process, reduce the construction period, and can further reduce design cost and investment cost, as well as improve the efficiency of the heliostat field; moreover, when one of the single towers malfunctions, the working situations of other tower solar thermal modules won't be affected, and thus the continuity and stability of power supply using the whole power generation system are ensured.

It should be understood that, those skilled in the art could complete modifications and variations according to the above instruction, and all the modifications and variations should be included within the scope of the appended claims.

What is claimed is:

1. A modular tower solar thermal power generation system, comprising: a solar thermal collector device configured for collecting solar thermal energy, a heat exchanger connected to the solar thermal collector device and configured for producing steam, and a thermal power conversion device connected to the heat exchanger and configured for converting steam into electrical energy; wherein, the solar thermal collector device comprises a plurality of tower solar thermal modules;

wherein, the plurality of tower solar thermal modules include a plurality of A-type tower solar thermal modules and a plurality of B-type tower solar thermal modules, the plurality of A-type tower solar thermal modules are all connected with the heat exchanger through a same centralized thermal storage unit configured to store thermal energy of heated thermal working medium, and each of the B-type tower solar thermal modules is connected to a distributed thermal storage unit configured to store thermal energy of heated thermal working medium, wherein, some of the A-type tower solar thermal modules are configured to use molten salt as thermal working medium, others of the A-type tower solar thermal modules are configured to use steam as thermal working medium, and all the B-type tower solar thermal modules are configured to use molten salt as thermal working medium; and all the A-type tower solar thermal modules using molten salt as thermal working medium are connected in parallel with the A-type tower solar thermal modules using steam as thermal working medium, the B-type tower solar thermal modules are connected in series with each other, and the A-type tower solar thermal modules are connected in parallel with the B-type tower solar thermal modules.

2. The solar thermal power generation system according to claim 1, wherein, each of the A-type tower solar thermal modules comprise a first heliostat configured for focusing sunlight and a first solar thermal tower provided with a first thermal collector; and the centralized thermal storage unit is configured to store thermal energy of heated thermal working medium from the first thermal collector.

3. The solar thermal power generation system according to claim 2, wherein, each of the B-type tower solar thermal modules comprise a second heliostat for focusing sunlight and a second solar thermal tower provided with a second thermal collector, and the distributed thermal storage unit is connected to the second solar thermal tower and configured for storing the thermal energy of heated thermal working medium from the second thermal collector.

4. The solar thermal power generation system according to claim 3, wherein, the heat exchanger includes a plurality of sub-thermal exchangers, and each of the B-type tower solar thermal modules includes one of the sub-thermal exchangers.

5. The solar thermal power generation system according to claim 4, wherein, the sub-thermal exchangers of each B-type tower solar thermal module is connected to the thermal power conversion device by a high temperature steam thermal storage device configured for storing steam.

6. The solar thermal power generation system according to claim 1, wherein, the generated power of each of the tower solar thermal modules is 10-25 MW.

7. The solar thermal power generation system according to claim 1, wherein, each of the B-type tower solar thermal modules comprise a second heliostat for focusing sunlight and a second solar thermal tower provided with a second thermal collector, and the distributed thermal storage unit is connected to the second solar thermal tower and configured for storing the thermal energy of heated thermal working medium from the second thermal collector.

8. A modular tower solar thermal power generation system, comprising: a solar thermal collector device configured for collecting solar thermal energy, a heat exchanger connected to the solar thermal collector device and configured for producing steam, and a thermal power conversion device connected to the heat exchanger and configured for converting steam into electrical energy; wherein, the solar thermal collector device comprises a plurality of tower solar thermal modules;

wherein, the plurality of tower solar thermal modules include a plurality of A-type tower solar thermal modules and a plurality of B-type tower solar thermal modules, the plurality of A-type tower solar thermal modules are all connected with the heat exchanger through a same centralized thermal storage unit configured to store thermal energy of heated thermal working medium, and each of the B-type tower solar thermal modules is connected to a distributed thermal storage unit configured to store thermal energy of heated thermal working medium, wherein, some of the A-type tower solar thermal modules are configured to use molten salt as thermal working medium, others of the A-type tower solar thermal modules are configured to use steam as thermal working medium, all the B-type tower solar thermal modules are configured to use molten salt as thermal working medium;

all the A-type tower solar thermal modules using molten salt as thermal working medium are connected in parallel with the A-type tower solar thermal modules using steam as thermal working medium, the B-type tower solar thermal modules are connected in parallel with each other, the A-type tower solar thermal modules are connected in parallel with the B-type tower solar thermal modules.

9. The solar thermal power generation system according to claim 8, wherein, each of the A-type tower solar thermal modules comprise a first heliostat configured for focusing sunlight and a first solar thermal tower provided with a first thermal collector; and the centralized thermal storage unit is configured to store thermal energy of heated thermal working medium from the first thermal collector.

10. The solar thermal power generation system according to claim 8, wherein, each of the B-type tower solar thermal modules comprise a second heliostat for focusing sunlight and a second solar thermal tower provided with a second thermal collector, and the distributed thermal storage unit is connected to the second solar thermal tower and configured for storing the thermal energy of heated thermal working medium from the second thermal collector.

11. The solar thermal power generation system according to claim 10, wherein, the heat exchanger includes a plurality of sub-thermal exchangers, and each of the B-type tower solar thermal modules includes one of the sub-thermal exchangers.

12. The solar thermal power generation system according to claim 11, wherein, the sub-thermal exchangers of each B-type tower solar thermal module is connected to the thermal power conversion device by a high temperature steam thermal storage device configured for storing steam.

* * * * *